(12) United States Patent
Roy et al.

(10) Patent No.: US 9,786,170 B2
(45) Date of Patent: Oct. 10, 2017

(54) IN-VEHICLE NOTIFICATION PRESENTATION SCHEDULING

(71) Applicant: Harman International Industries, Incorporated, Stamford, CT (US)

(72) Inventors: Tirtha Roy, Lake Zurich, IL (US); William Taranowski, Libertyville, IL (US); Ilya Pautov, Wauconda, IL (US); Ryan Speer, Libertyville, IL (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/590,896

(22) Filed: Jan. 6, 2015

(65) Prior Publication Data

US 2015/0191122 A1  Jul. 9, 2015

Related U.S. Application Data

(60) Provisional application No. 61/924,047, filed on Jan. 6, 2014.

(51) Int. Cl.

| | |
|---|---|
| *G08G 1/0967* | (2006.01) |
| *G08G 1/0962* | (2006.01) |
| *B60W 40/09* | (2012.01) |
| *G08G 1/09* | (2006.01) |
| *G08G 1/0968* | (2006.01) |
| *B60W 40/08* | (2012.01) |
| *B60W 50/12* | (2012.01) |
| *B60W 50/00* | (2006.01) |

(52) U.S. Cl.
CPC ........... *G08G 1/0962* (2013.01); *B60W 40/09* (2013.01); *G08G 1/091* (2013.01); *G08G 1/096716* (2013.01); *G08G 1/096741* (2013.01); *G08G 1/096775* (2013.01); *G08G 1/096827* (2013.01); *B60W 50/12* (2013.01); *B60W 2040/0809* (2013.01); *B60W 2050/0077* (2013.01); *B60W 2540/04* (2013.01); *B60W 2540/28* (2013.01)

(58) Field of Classification Search
CPC ................................................. B60W 2540/00
See application file for complete search history.

(56) References Cited

U.S. PATENT DOCUMENTS

| | | | | |
|---|---|---|---|---|
| 8,326,794 | B1 * | 12/2012 | Wood | G06F 11/3485 707/600 |
| 2009/0076700 | A1 * | 3/2009 | Radpour | G07C 5/008 701/93 |
| 2012/0077471 | A1 * | 3/2012 | Hayashi | H04W 4/16 455/414.1 |
| 2013/0158778 | A1 * | 6/2013 | Tengler | G08G 1/096716 701/31.5 |
| 2014/0200737 | A1 * | 7/2014 | Lortz | B60R 25/25 701/1 |

(Continued)

*Primary Examiner* — Benyam Haile
(74) *Attorney, Agent, or Firm* — McCoy Russell LLP

(57) ABSTRACT

Embodiments are disclosed for scheduling and presenting notifications, via an in-vehicle computing system, to a driver of a vehicle. In some embodiments, a method for an in-vehicle computing system includes receiving data regarding a notification for presentation to a driver of a vehicle. The method further includes, based on a driver profile, adjusting a timing of presenting the notification to the driver via the in-vehicle computing system, wherein the driver profile is generated based on past driving behavior associated with the driver.

19 Claims, 9 Drawing Sheets

(56) References Cited

U.S. PATENT DOCUMENTS

2015/0035666 A1* 2/2015 Scofield .............. G08G 1/0112
340/439
2015/0266455 A1* 9/2015 Wilson ................ G08G 1/0112
701/93

* cited by examiner

IN-VEHICLE NOTIFICATION PRESENTATION SCHEDULING

CROSS REFERENCE TO RELATED APPLICATIONS

This application claims priority to U.S. Provisional Patent Application No. 61/924,047, entitled "IN-VEHICLE NOTIFICATION PRESENTATION SCHEDULING," filed Jan. 6, 2014, the entire contents of which are hereby incorporated by reference for all purposes.

FIELD

The disclosure relates to presenting notifications on an in-vehicle computing system.

BACKGROUND

In-vehicle computing systems, such as head units for infotainment systems, may include a display and/or interface with speakers of a vehicle in order to present a notification to a user. For example, the notification may be presented in order to inform the user of an event, such as an availability of upgrade data to upgrade software executed on the in-vehicle computing system.

SUMMARY

Embodiments are disclosed for scheduling and presenting notifications, via an in-vehicle computing system, to a driver of a vehicle. In some embodiments, a method for an in-vehicle computing system includes receiving data regarding a notification for presentation to a driver of a vehicle. The method further includes, based on a driver profile, adjusting a timing of presenting the notification to the driver via the in-vehicle computing system, wherein the driver profile is generated based on past driving behavior associated with the driver.

In some embodiments, an in-vehicle computing system includes a processor; a navigational device, a communication interface communicatively coupling the in-vehicle computing system to a cloud-based network, a display device, and a storage device storing instructions executable by the processor to receive a notification for presentation to a vehicle driver from the cloud-based network, the notification regarding a vehicle parameter. The instructions may be further executable to adjust a timing of displaying the notification to the vehicle driver on the display device during vehicle travel based on positional and temporal information of the vehicle received from the navigational device.

In other embodiments, an in-vehicle computing system includes a processor; an in-vehicle entertainment system; a navigational device; a communication interface communicatively coupling the in-vehicle computing system to a cloud-based network; a display device; and a storage device storing instructions executable by the processor to receive a notification for presentation to a vehicle driver from the cloud-based network, the notification regarding a vehicle parameter. The instructions may be further executable to infer a current vehicle status based on navigational data from the navigational device, infer a current user status based on interactions of the vehicle driver with the in-vehicle entertainment system, and identify the vehicle driver based on current driving behavior in relation to one or more driver profiles stored on the cloud-based network, the one or more driver profiles generated based on past driving behavior associated with each vehicle driver. The instructions may be still further executable to adjust a timing of displaying the notification on the display device to the vehicle driver based on each of the identity of the vehicle driver, the inferred current vehicle status, and the inferred current user status.

BRIEF DESCRIPTION OF THE DRAWINGS

The disclosure may be better understood from reading the following description of non-limiting embodiments, with reference to the attached drawings, wherein below.

DETAILED DESCRIPTION

Notifications presented using in-vehicle computing systems may inform a driver of events, such as arrival at a destination, changes to a vehicle/vehicle system status, personal calendar events, available upgrades to the in-vehicle computing system, vehicle recall data, environmental information, etc. While some notifications, such as the notification that the driver has arrived at a programmed destination, may be presented without the need for user input, other notifications may request the attention of the driver to approve and/or select an action or provide other types of input to the system. Such notifications may be distracting to the driver, which may present safety concerns when the driver is simultaneously controlling operation of the vehicle. The notifications may also have a decreased success rate (e.g., success in notifying the driver of the event and/or success in receiving user input approving and/or selecting an action responsive to the event) when presented at certain times (e.g., when the driver is pre-occupied with other tasks). For example, a driver may be more likely to ignore and/or dismiss a notification of an available upgrade for the in-vehicle computing system when focused on other tasks.

The present disclosure presents embodiments related to intelligent scheduling and presentation of notifications, such as a notification of an available update/upgrade for an in-vehicle computing system. Data for such updates/upgrades may be received at the in-vehicle computing system (e.g., as an over-the-air and/or push communication process), however the updates/upgrades may not be installed on the in-vehicle computing device until a driver/user of the in-vehicle computing system acknowledges the notification and/or approves the installation. The notification may be scheduled based on the current driver of the vehicle, as well as other dynamic and static information, including vehicle and/or user status, in order to increase the likelihood that the notification is presented at a safe and convenient time for the driver. By intelligently scheduling the notification of the availability of the update/upgrade, the driver may be more likely to accept the upgrade, thereby enabling the functionality of the in-vehicle computing system to be adjusted (e.g., new features to be added, malfunctions to be addressed/fixed, etc.). Although described in the context of a notification of an update/upgrade, it is to be understood that the systems and methods of the present disclosure may be utilized to schedule any suitable type of notification.

Figure 1:
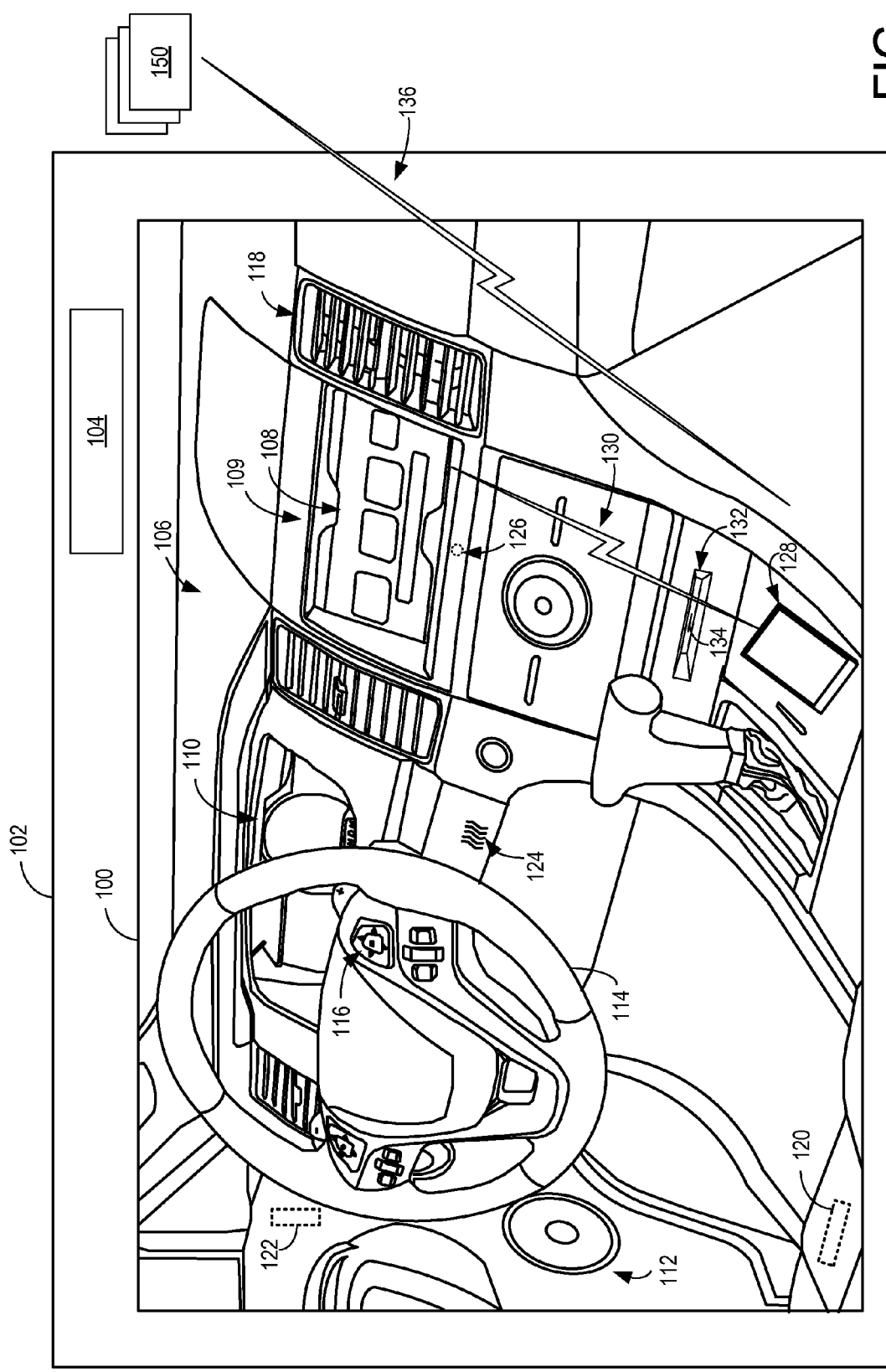
FIG. 1 shows an example partial view of an interior of a cabin of a vehicle in accordance with one or more embodiments of the present disclosure.

FIG. 1 shows an example partial view of an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link

[MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may also be communicatively coupled to additional devices operated by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include an upgrade server and communication link 136 may transmit upgrade data and/or a notification of an available upgrade from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
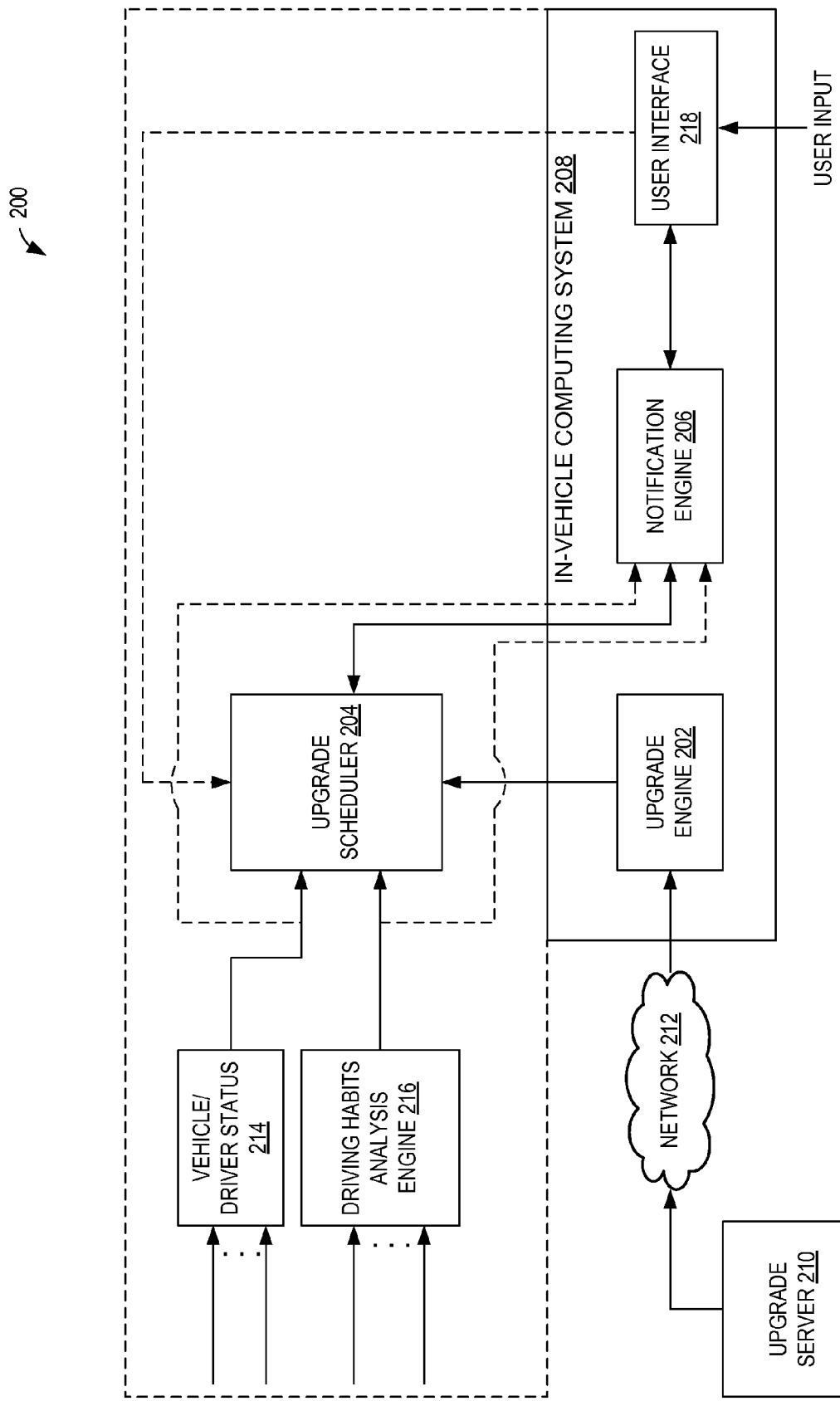
FIG. 2 shows example architecture for an upgrade notification presentation scheduling system in accordance with one or more embodiments of the present disclosure.

FIG. 2 shows example architecture for an upgrade notification presentation scheduling system 200 including an upgrade engine 202, an upgrade scheduler 204, and a notification engine 206. The upgrade engine 202 may be included in an in-vehicle computing system 208 and may be operable to receive upgrade data from extra-vehicle devices, such as upgrade server 210 (e.g., a cloud computing system coupled to the in-vehicle computing system 208 via network 212). The upgrade data may enable the upgrade engine 202 to upgrade installed software and/or firmware of the in-vehicle computing system 208. In some embodiments, the upgrade data may include all data for performing the upgrade; while in other embodiments, the upgrade data may include a pointer and/or link to all of the data for performing the upgrade. The upgrade data may be compressed and/or encrypted in some embodiments in order to conserve resources (e.g., storage space) and/or increase security. The upgrade engine 202 may process the upgrade data in order to decrypt, uncompress, and/or otherwise ready the data for use in performing the associated upgrade. While the upgrade server 210 is illustrated as being remote to the in-vehicle computing system and described above as being external and/or remote to the vehicle, in some embodiments, an external device such as a mobile phone in communication with the in-vehicle computing system 208 may be configured to provide upgrade data. In such embodiments, the mobile phone may be located within and/or remote to the vehicle housing the in-vehicle computing system 208 while providing the upgrade data to the upgrade engine 202.

Responsive to receiving the upgrade data from the upgrade server 210, the upgrade engine 202 may provide an indication of such an event (e.g., the availability of upgrade data for performing an upgrade to the in-vehicle computing system) to the upgrade scheduler 204. The indication may be a trigger for providing a notification to the driver of the vehicle via the in-vehicle computing system. The upgrade scheduler 204 may determine and/or select a scheduled notification presentation time for presenting the notification to the driver based on one or more parameters. Although referred to as a presentation "time," it is to be understood that the time may be an actual time of day or defined based on another parameter, such as a location and/or status of the vehicle. For example, a scheduled notification presentation "time" may be defined as the time at which the vehicle arrives at a particular destination and/or location.

The upgrade scheduler 204 may receive information from a vehicle and/or driver status aggregator 214 and/or a driving habits analysis engine 216 and base the presentation time on the received information. For example, the information may be received as the information becomes available (e.g., responsive to changes in the information), as a periodic update, and/or responsive to the trigger received from the upgrade engine indicating the presence of upgrade data. The vehicle/driver status aggregator 214 may receive inputs from one or more vehicle systems to determine dynamic information relating to the operation of the vehicle. For example, the vehicle/driver status aggregator 214 may receive input (e.g., via a CAN bus of the vehicle) from one or more sensors of the vehicle indicating vehicle/engine speed, acceleration, engine status, etc. The vehicle/driver status aggregator 214 may additionally or alternatively access a sensor(s), such as a GPS device and/or navigation system of the vehicle/in-vehicle computing system to determine a current location of the vehicle, a route of the vehicle, and/or a travel vector (e.g., a direction of travel based on observed vehicular travel details) that may indicate an intended destination of the vehicle. In some embodiments, the vehicle/driver status aggregator 214 may indicate an identity of a driver and/or passengers of the vehicle and activities of the driver and/or passengers (e.g., based on vehicle operational data and interaction with the in-vehicle computing system).

The driving habits analysis engine may receive inputs from one or more vehicle systems and/or storage devices indicating historical data regarding users of the vehicle. For example, the driving habits analysis engine 216 may record and/or process information indicative of driving styles and/or frequent navigational characteristics of different drivers of the vehicle and build driver profiles associated with each driver. In some embodiments, the driving habits analysis engine 216 may receive information from one or more of the same information sources (e.g., sensors, vehicle systems, etc.) as the vehicle/driver status aggregator 214. The upgrade scheduler 204 may compare the vehicle/driver status information from the vehicle/driver status aggregator 214 with the driver profiles generated by the driving habits analysis engine 216 in order to determine a current driver and other parameters associated with a current driving experience. For example, a driver profile may include observed driving behavior associated with the driver, such as a driving route, a seat position, steering wheel position, accelerator pedal usage profile, brake pedal usage profile, vehicle turning hardness, interaction with a user interface, etc., as measured during prior vehicle trips. Based on this information, the upgrade scheduler 204 may determine one or more notification presentation times and transmit the determined presentation times to the notification engine 206. As indicated by the dashed lines in FIG. 2, it is to be understood that the information from the vehicle/driver status aggregator 214 and the driving habits analysis engine 216 may be provided directly to the notification engine 206, for example when a notification other than an upgrade notification is to be presented to a driver/passenger of the vehicle (e.g., standalone messages that request driver input). In such examples, information from the vehicle/driver status aggregator 214 and the driving habits analysis engine 216 may additionally or alternatively be sent to a notification scheduler that operates similarly to the upgrade scheduler 204 and is triggered to schedule a notification based on a different notification initiator (e.g., an application running on the in-vehicle computing system 208, an external source other than the upgrade server 210, etc.). The notification scheduler may be included in or include the upgrade scheduler 204.

It is to be understood that one or more of the components illustrated may be included in and/or integrated with the in-vehicle computing system 208. For example, one or more of the vehicle/driver status aggregator 214, the driving habits analysis engine 216, and/or the upgrade scheduler 204 may be included in the in-vehicle computing system 208 in some embodiments. In other embodiments, one or more of the above-referenced components may be external to the in-vehicle computing system 208 and integrated elsewhere in the vehicle. In still other embodiments, one or more of the above-referenced components may be external to the in-vehicle computing system 208 and remote from the vehicle (e.g., integrated in a computing system that is external to the vehicle and/or a mobile device that is removable from the vehicle).

The notification engine 206 may be operable to generate and/or transmit a notification to a user interface 218 for the in-vehicle computing system 208. The generated notification may include instructions to be executed by the in-vehicle computing system 208 to present the notification to the driver and/or passengers of the vehicle via a display and/or speakers of the vehicle. For example, the user interface 218 may include a graphical user interface displayed on a display of the in-vehicle computing system 208. The user interface may enable the user to interact with the in-vehicle computing system 208 (e.g., via input to a touch screen associated with the display, voice commands, and/or any other suitable input mechanism) in order to control the in-vehicle computing system 208 and/or component(s) communicatively connected to the in-vehicle computing system 208. Notifications generated by the notification engine 206 may only be informative (e.g., may not request and/or enable user input to be directed to the notification) in some embodiments, while in other embodiments, notifications may be user interactive (e.g., may request and/or enable user input to be provided in response to the notification to acknowledge and/or perform an action associated with the notification).

An example of an interactive notification may be a notification of an available upgrade for the in-vehicle computing system 208 that requests acknowledgement and/or permission from the user to download and/or install the upgrade. The notification engine 206 may present the notification to the user (e.g., via the user interface 218), and may receive user input indicated whether or not the user permits the upgrade to be downloaded and/or installed. Responsive to a positive response from a user (e.g., indicating that the user permits the installation and/or download of the upgrade), the user input and/or an indication of the positive response may be transmitted to the upgrade scheduler 204 and/or to the upgrade engine 202 in order to initiate the upgrade process (e.g., download upgrade data, perform the installation of the upgrade, etc.). Responsive to a negative response from a user (e.g., indicating that the user has ignored or dismissed the notification and/or that the user does not permit the installation and/or download of the upgrade), the negative response may be sent to the notification engine 206 and/or the upgrade scheduler 204 in order to reschedule the notification. For example, the upgrade scheduler 204 may determine one or more alternate times to present the notification to the driver responsive to a negative response from the driver. The alternate times may be determined based on the information from the vehicle/driver status aggregator 214 and/or the driving habits analysis engine 216. For example, the alternate times may be suggested based on historical data regarding operational conditions present during a previously successful upgrade installation.

In some embodiments, the notification engine 206 may automatically (e.g., without user input) present the notification at one of the alternate times (e.g., automatically defer presentation of the notification); while in other embodiments, the notification engine 206 may generate an alternate time request notification for presentation at the user interface 218 of the in-vehicle computing system. The alternate time request notification may present one or more of the alternate times determined by the upgrade scheduler 204 for selection by the driver. In some embodiments, the notification may enable the driver to designate an alternate time (e.g., in addition or as an alternative to presenting the alternate times determined by the upgrade scheduler 204). The alternate time may be presented as a particular date/time (e.g., 5 pm), a relative date/time (e.g., 3 hours from the current time), a vehicle/driver status (e.g., when the vehicle arrives at a particular destination), and/or any other suitable format. Responsive to selecting and/or inputting an alternative time, the user input and/or an indication of the user input may be sent to the upgrade scheduler to schedule the upgrade notification accordingly. Upon reaching the alternative time, the upgrade scheduler may trigger the notification engine to generate and send the notification to the user interface for presentation to the driver.

Figure 3:
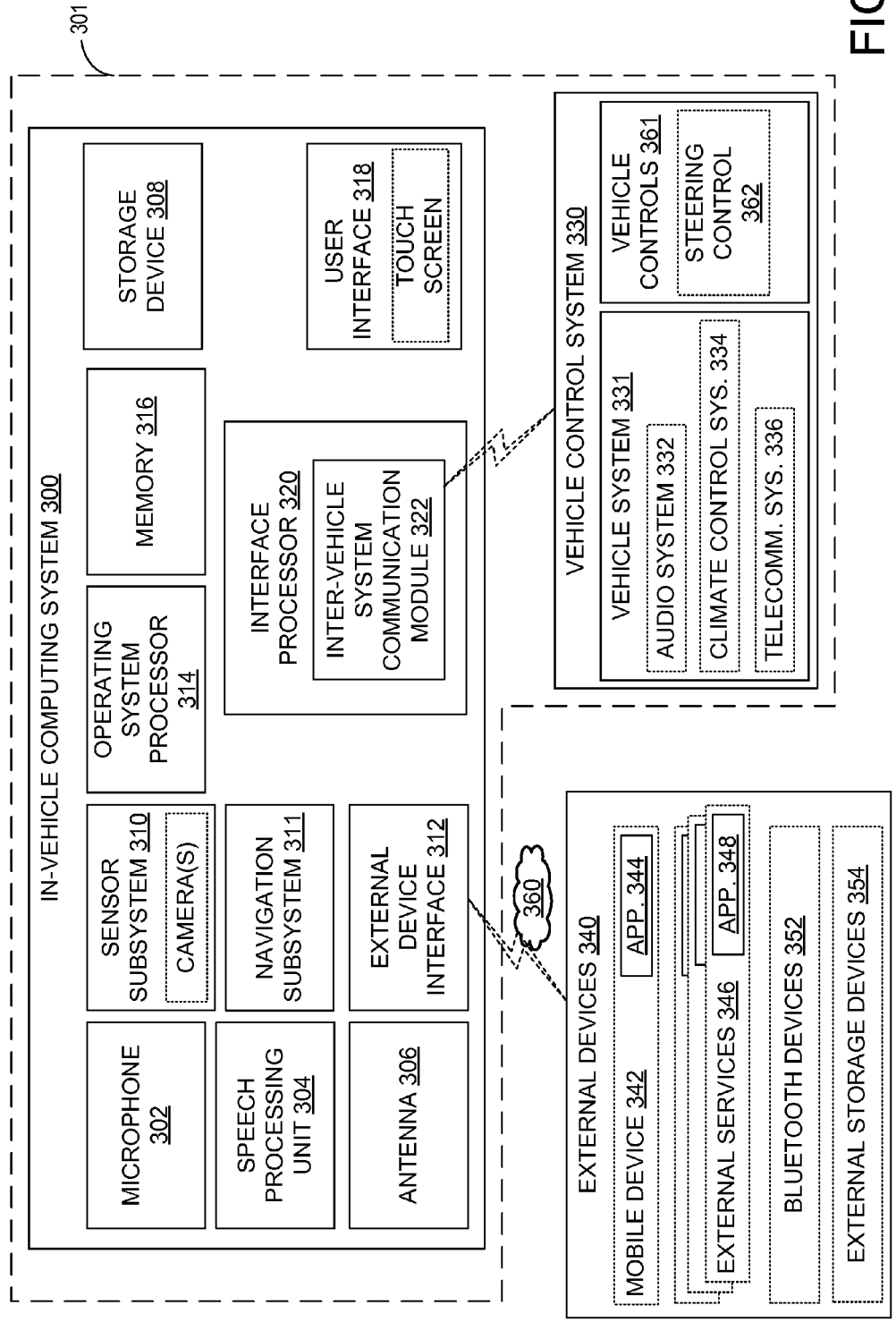
FIG. 3 is a block diagram of an in-vehicle computing system in accordance with one or more embodiments of the present disclosure.

FIG. 3 shows a block diagram of an in-vehicle computing system 300 configured and/or integrated inside vehicle 301. In-vehicle computing system 300 may be an example of in-vehicle computing system 109 of FIG. 1 in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 301 in order to enhance an in-vehicle experience for a driver and/or a passenger.

In-vehicle computing system 300 may include one or more processors including an operating system processor 314 and an interface processor 320. Operating system processor 314 may execute an operating system on the in-vehicle computing system, and control input/output, display, playback, and other operations of the in-vehicle computing system. Interface processor 320 may interface with a vehicle control system 330 via an inter-vehicle system communication module 322.

Inter-vehicle system communication module 322 may output data to other vehicle systems 331 and vehicle control elements 361, while also receiving data input from other vehicle components and systems 331, 361, e.g. by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 308 may be included in in-vehicle computing system 300 to store data such as instructions executable by processors 314 and 320 in non-volatile form. The storage device 308 may store application data to enable the in-vehicle computing system 300 to run an application for connecting to and/or pairing with a mobile device and/or a wearable device. The storage device 308 may additionally or alternatively store application data to enable the in-vehicle computing system 300 to run an application for downloading and/or installing an upgrade to the in-vehicle computing system 300, as described above with respect to FIG. 2. In-vehicle computing system 300 may further include a volatile memory 316. Volatile memory 316 may be random access memory (RAM). Non-transitory storage devices, such as non-volatile storage device 308 and/or volatile memory 316, may store instructions and/or code that, when executed by a processor (e.g., operating system processor 314 and/or interface processor 320), controls the in-vehicle computing system 300 to perform one or more of the actions described in the disclosure.

A microphone 302 may be included in the in-vehicle computing system 300 to receive voice commands and/or voice queries from a user and/or to measure ambient noise in the vehicle. A speech processing unit 304 may process the received voice data and/or the received voice data may be transmitted to an external voice recognition server located remotely to the vehicle and/or in-vehicle computing system 300. In some embodiments, in-vehicle computing system 300 may also be able to receive voice commands/queries and sample ambient vehicle noise using a microphone included in an audio system 332 of the vehicle.

One or more additional sensors may be included in a sensor subsystem 310 of the in-vehicle computing system 300. For example, the sensor subsystem 310 may include a camera, such as a rear view camera for assisting a user in parking the vehicle. Sensor subsystem 310 of in-vehicle computing system 300 may communicate with and receive inputs from various vehicle sensors and may further receive user inputs. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 310 alone, other sensors may communicate with both sensor subsystem 310 and vehicle control system 330, or may communicate with sensor subsystem 310 indirectly via vehicle control system 330. A navigation subsystem 311 of in-vehicle computing system 300 may generate and/or receive navigation information such as location information (e.g., via a GPS sensor and/or other sensors from sensor subsystem 310), route guidance, traffic information, point-of-interest (POI) identification, and/or provide other navigational services for the driver.

External device interface 312 of in-vehicle computing system 300 may be couplable to and/or communicate with one or more external devices 340 located external to vehicle 301. While the external devices are illustrated as being located external to vehicle 301, it is to be understood that they may be temporarily housed in vehicle 301, such as when the user is operating the external devices while operating vehicle 301. For example, the external devices 340 are not integral to vehicle 301. The external devices 340 may include a mobile device 342 (e.g., connected via a Bluetooth connection) or an alternate Bluetooth-enabled device 352. Mobile device 342 may be a mobile phone, smart phone, wearable devices/sensors that may communicate with the in-vehicle computing system via wired and/or wireless communication, or other portable electronic device(s). Other external devices include external services 346, such as upgrade server 210 of FIG. 2. For example, the external devices may include extra-vehicular devices that are separate from and located externally to the vehicle. Still other external devices include external storage devices 354, such as solid-state drives, pen drives, USB drives, etc. External devices 340 may communicate with in-vehicle computing system 300 either wirelessly or via connectors without departing from the scope of this disclosure. For example, external devices 340 may communicate with in-vehicle computing system 300 through the external device interface 312 over network 360, a universal serial bus (USB) connection, a direct wired connection, a direct wireless connection, and/or other communication link. The external device interface 312 may provide a communication interface to enable the in-vehicle computing system to communicate with mobile devices associated with contacts of the driver. For example, the external device interface 312 may enable phone calls to be established and/or text messages (e.g., SMS, MMS, etc.) to be sent (e.g., via a cellular communications network) to a mobile device associated with a contact of the driver.

One or more applications 344 may be operable on mobile device 342. As an example, mobile device application 344 may be operated to aggregate user data regarding interactions of the user with the mobile device. For example, mobile device application 344 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 344 to external device interface 312 over network 360. In addition, specific user data requests may be received at mobile device 342 from in-vehicle computing system 300 via the external device interface 312. The specific data requests may include requests for determining where the user is geographically located, an ambient noise level and/or music genre at the user's location, an ambient weather condition (temperature, humidity, etc.) at the user's location, etc. Mobile device application 344 may send control instructions to components (e.g., microphone, etc.) or other applications (e.g., navigational applications) of mobile device 342 to enable the requested data to be collected on the mobile device. Mobile device application 344 may then relay the collected information back to in-vehicle computing system 300.

Likewise, one or more applications 348 may be operable on external services 346. As an example, external services applications 348 may be operated to aggregate and/or analyze data from multiple data sources. For example, external services applications 348 may aggregate data from one or more social media accounts of the user, data from the in-vehicle computing system (e.g., sensor data, log files, user input, etc.), etc. The collected data may be transmitted to another device and/or module, such as an upgrade scheduler, and/or analyzed by the application to determine driving habits of the driver and/or vehicle/driver status information.

Vehicle control system 330 may include controls for controlling aspects of various vehicle systems 331 involved in different in-vehicle functions. These may include, for example, controlling aspects of vehicle audio system 332 for providing audio entertainment to the vehicle occupants, aspects of climate control system 334 for meeting the cabin cooling or heating needs of the vehicle occupants, as well as aspects of telecommunication system 336 for enabling vehicle occupants to establish telecommunication linkage with others.

Audio system 332 may include one or more acoustic reproduction devices including electromagnetic transducers such as speakers for providing audio output to a driver and/or passengers of the vehicle. For example, the audio output may correspond to text-to-speech output presenting an audible notification to a user. Vehicle audio system 332 may be passive or active such as by including a power amplifier. In some examples, in-vehicle computing system 300 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 334 may be configured to provide a comfortable environment within the cabin or passenger compartment of vehicle 301. Climate control system 334 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 330 may also include controls for adjusting the settings of various vehicle controls 361 (or vehicle system control elements) related to the engine and/or auxiliary elements within a cabin of the vehicle, such as steering wheel controls 362 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. The control signals may also control audio output at one or more speakers of the vehicle's audio system 332. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 334. For example, the control signals may increase delivery of cooled air to a specific section of the cabin.

Control elements positioned on an outside of a vehicle (e.g., controls for a security system) may also be connected to computing system 300, such as via communication module 322. The control elements of the vehicle control system may be physically and permanently positioned on and/or in the vehicle for receiving user input. In addition to receiving control instructions from in-vehicle computing system 300, vehicle control system 330 may also receive input from one or more external devices 340 operated by the user, such as from mobile device 342. This allows aspects of vehicle systems 331 and vehicle controls 361 to be controlled based on user input received from the external devices 340.

In-vehicle computing system 300 may further include an antenna 306. Antenna 306 is shown as a single antenna, but may comprise one or more antennas in some embodiments. The in-vehicle computing system may obtain broadband wireless internet access via antenna 306, and may further receive broadcast signals such as radio, television, weather, traffic, and the like. The in-vehicle computing system may receive positioning signals such as GPS signals via one or more antennas 306. The in-vehicle computing system may also receive wireless commands via RF such as via antenna(s) 306 or via infrared or other means through appropriate receiving devices. In some embodiments, antenna 306 may be included as part of audio system 332 or telecommunication system 336. Additionally, antenna 306 may provide AM/FM radio signals to external devices 340 (such as to mobile device 342) via external device interface 312.

One or more elements of the in-vehicle computing system 300 may be controlled by a user via user interface 318. User interface 318 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 300 and mobile device 342 via user interface 318. In addition to receiving a user's vehicle setting preferences on user interface 318, vehicle settings selected by in-vehicle control system may be displayed to a user on user interface 318. Notifications and other messages, as well as navigational assistance, may be displayed to the user on a display of the user interface. The user interface 318 may also include information to enable a user to interact with notifications, such as upgrade availability notifications, as described above with respect to FIG. 2.

Figure 4:
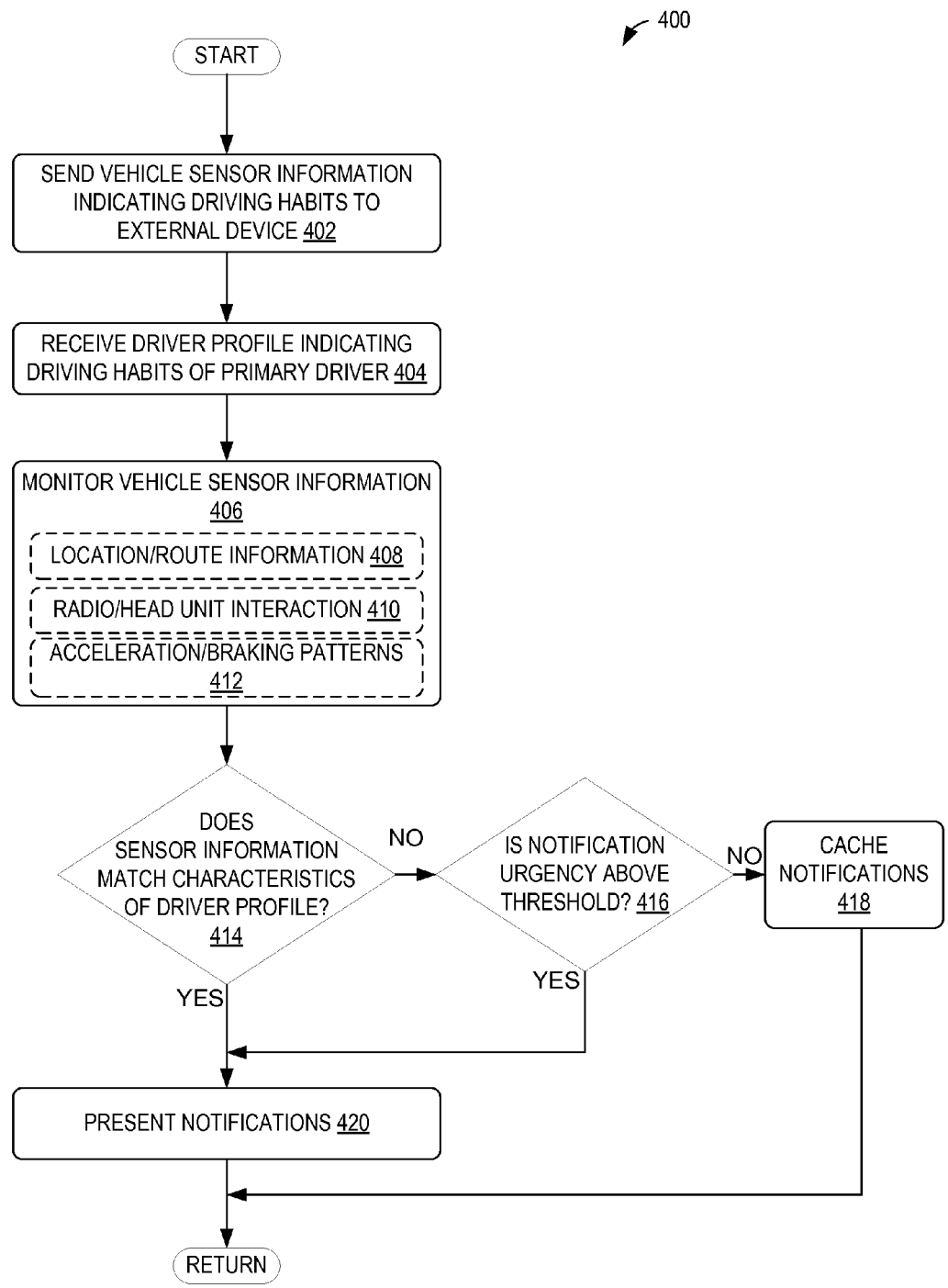
FIG. 4 is a flow chart of a method of presenting notifications for an in-vehicle computing system based on an identification of a driver of a vehicle in accordance with one or more embodiments of the present disclosure.

FIG. 4 is a flow chart of a method 400 of presenting notifications for an in-vehicle computing system based on an identification of a driver of a vehicle. The method 400 may be performed by an upgrade scheduler, such as upgrade scheduler 204 of FIG. 2, which may be integrated in the in-vehicle computing system in some embodiments. At 402, the method 400 includes sending vehicle sensor information indicating driving habits to an external device. In some embodiments, the external device may include an extra-vehicle server for aggregating data from one or more vehicles. At 404, the method 400 includes receiving a driver profile indicating driving habits of a primary driver of the vehicle. For example, the driver profile may provide information regarding the driving style, frequent navigational routes/destinations, in-vehicle computing system interaction, and/or other driving habits associated with a primary driver (e.g., an owner and/or most frequent operator of the vehicle).

At 406, the method 400 includes monitoring vehicle sensor information, such as location and/or route information, as indicated at 408, radio and/or head unit interaction, as indicated at 410, and/or acceleration/braking patterns, as indicated at 412. For example, the method may include inferring a vehicle route and destination based on the positional and temporal information of the sensed data. It is to be understood that the above-referenced sensor information is exemplary in nature, and any suitable information may be monitored to compare with information in a driver profile to determine a driver of the vehicle and/or whether the driver of the vehicle is a primary driver. At 414, the method 400 includes determining if the sensor information matches characteristics of a driver profile. For example, the sensor information may be determined to match characteristics of a driver profile if a threshold amount of sensed data is within a threshold tolerance of the characteristics present in a primary driver profile. The characteristics and/or sensed information may be weighted, such that different characteristics and/or sensed data may contribute differently toward matching the sensor information with the driver profile.

If the sensor information does not match characteristics of the driver profile (e.g., "NO" at 414), the current driver of the vehicle may be identified as not being the primary driver of the vehicle (e.g., the current driver may be identified as a secondary driver), and the method 400 may include determining if a notification urgency of a particular notification is above an urgency threshold, as indicated at 416. Accordingly, different notifications may have different levels of urgency based on the importance associated with the notification. For example, notifications that affect the safety of the driver and/or passengers of the vehicle may be given a higher priority than other notifications. If the urgency of a given notification is not above the threshold (e.g., "NO" at 416), the method 400 may include caching (e.g., delaying presentation of) that notification, as indicated at 418. Caching the notification may include storing the notification and/or information related to the notification (e.g., locally at the in-vehicle computing system and/or at an external device) for presentation at a later time (e.g., when the primary driver is identified as the driver of the vehicle). Alternatively, if the urgency of a given notification is above the threshold (e.g., "YES" at 416), the method 400 may proceed to 420 to present that notification.

It is to be understood that the urgency of the notification may additionally or alternatively be associated with a status of passengers of the vehicle. For example, a different urgency threshold may be utilized when one or more passengers are located in the vehicle, as the passengers may be capable of consuming and/or interacting with the notification without distracting the driver. Any suitable contextual information regarding a vehicle/user status and/or a content/type of notification may be utilized along with the urgency level and/or in addition to the urgency level in determining whether or not to present the notification.

Responsive to determining that the sensor information does match the characteristics of the primary driver profile (e.g., "YES" at 414), the method proceeds to 420 to present notifications to the driver. In some embodiments, all notifications may be presented to the current driver when the current driver is determined to be the primary driver. In other embodiments, notifications may be associated with particular drivers, such that all notifications associated with a primary driver are presented to the current driver when the current driver is determined to be the primary driver.

Figure 5:
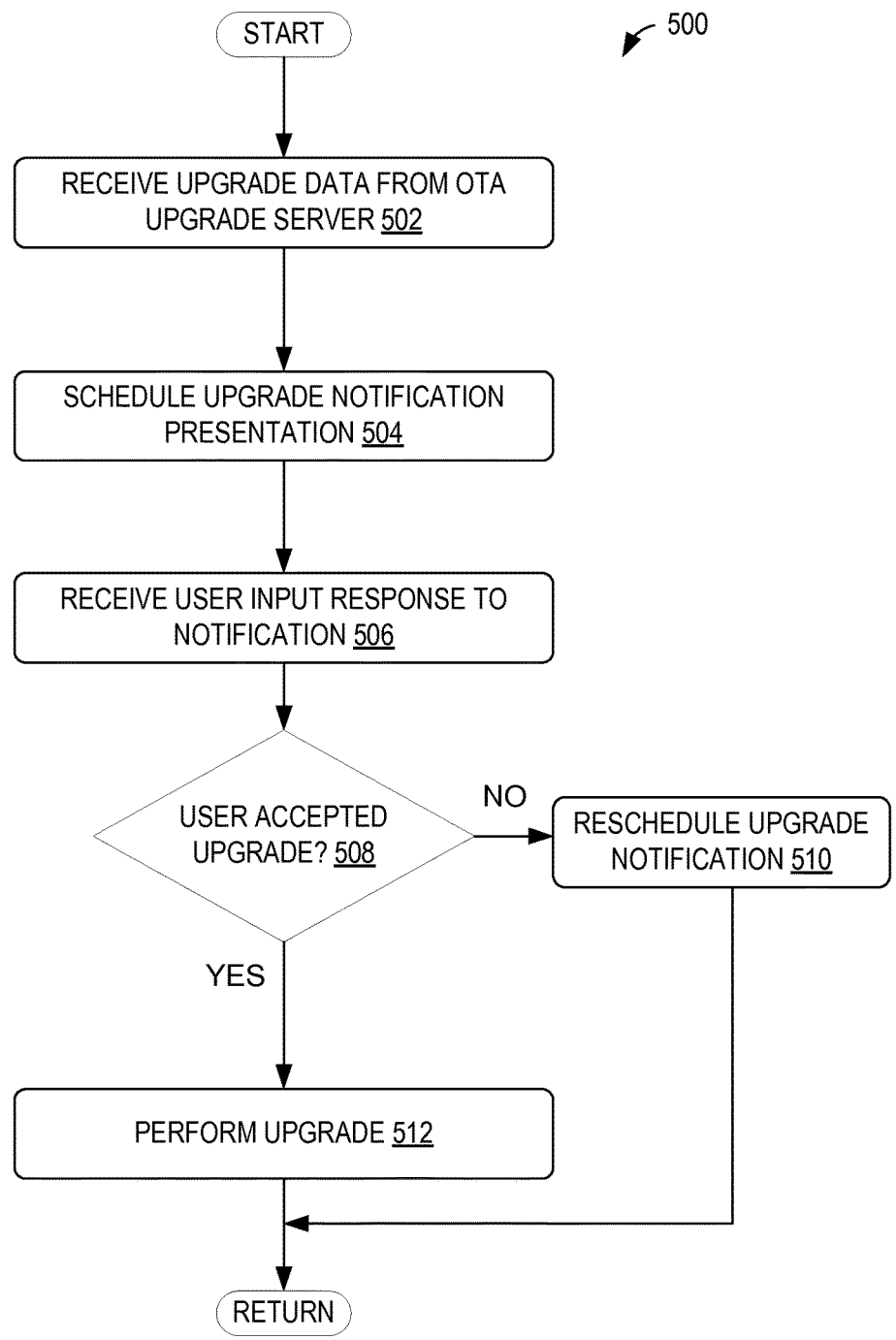
FIG. 5 is a flow chart of a method for performing an upgrade of an in-vehicle computing system in accordance with one or more embodiments of the present disclosure.

FIG. 5 is a flow chart of a method 500 for performing an upgrade (e.g., a software and/or firmware upgrade) of an in-vehicle computing system. At 502, the method 500 includes receiving upgrade data from an upgrade server, such as an Over-the-Air (OTA) upgrade server, associated with an available upgrade for the in-vehicle computing system. For example, the upgrade data may include all data for performing the upgrade; while in other embodiments, the upgrade data may include a pointer and/or link to all of the data for performing the upgrade. At 504, the method includes scheduling an upgrade notification presentation. For example, the upgrade notification may indicate that an upgrade to the in-vehicle computing system is available and/or request input from a driver of the vehicle to acknowledge and/or permit the upgrade to be performed.

The method 500 includes receiving a user input response to the notification, as indicated at 506. In some embodiments, the user input response may be a voice command, touch input to a display of the in-vehicle computing system, and/or any other user input provided in response to the notification. At 508, the method 500 includes determining if a user accepted the upgrade. For example, a driver may accept the upgrade if the driver acknowledges the notification and/or provides an affirmative/positive response to a request to perform the upgrade. If the user does not accept the upgrade (e.g., "NO" at 508), the method 500 proceeds to 510 to reschedule the upgrade notification. For example, the user may be determined to have not accepted the upgrade if the user input response dismissed and/or provided a negative response to the request to perform the upgrade (e.g., the driver selected to delay and/or not perform the upgrade) or if the user did not provide any suitable user input response within a threshold response time. Accordingly, the notification may be rescheduled such that the notification is displayed again at a later time. The rescheduled notification may be identical to or different from the previously-presented notification (e.g., based on the user input response and/or the content/type of the notification). It is to be understood that the upgrade may be dismissed without rescheduling the notification in some embodiments, such as when the user input response indicates that the driver does not approve the upgrade to be performed at any time (e.g., if the driver rejects the upgrade notification and requests that the notification is not be displayed again). In such embodiments, the upgrade data may be removed from the in-vehicle computing system and the upgrade may not be performed.

If the driver accepts the upgrade (e.g., "YES" at 508), the method proceeds to 512 to perform the upgrade. For example, performing the upgrade may include acquiring additional upgrade data (e.g., as identified and/or pointed to by the upgrade data received at the in-vehicle computing system), executing non-transitory code to install the upgrade, and/or restarting the in-vehicle computing system to operate the system with the added and/or changed functionality provided by the upgrade.

Figure 6:
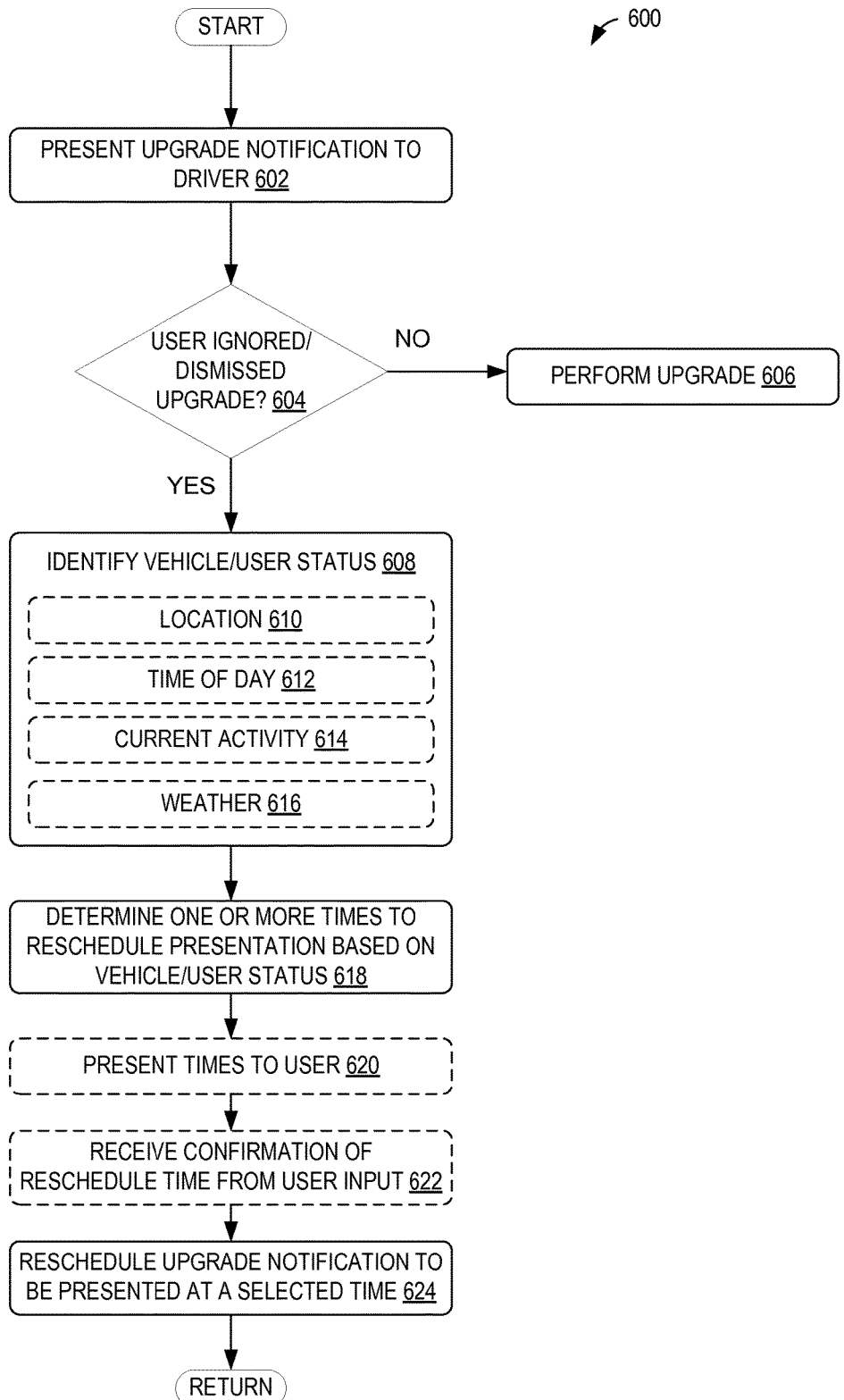
FIG. 6 is a flow chart of a method of rescheduling a presentation of a notification to a driver in accordance with one or more embodiments of the present disclosure.

FIG. 6 is a flow chart of a method 600 of rescheduling a presentation of a notification to a driver. For example, the method 600 may be performed by an upgrade scheduler associated and/or integrated with an in-vehicle computing system. While the flow chart refers to an upgrade notification, it is to be understood that the method may be performed by an in-vehicle computing system to reschedule presentation of any suitable notification. At 602, the method 600 includes presenting an upgrade notification to a driver of a vehicle. For example, the notification may be displayed on a display of the in-vehicle computing system and/or presented audibly via speakers of the vehicle. At 604, the method 600 includes determining if the user ignored and/or dismissed the notification. If the user did not ignore and/or dismiss the upgrade (e.g., "NO" at 604), the method includes performing the upgrade at 606.

If the user ignored and/or dismissed the upgrade (e.g., "YES" at 604), the method proceeds to 608 to identify a vehicle and/or user status. The vehicle and/or user status may include information such as a location of the vehicle, as indicated at 610, a time of day, as indicated at 612, a current activity of the user/vehicle (e.g., whether the driver is on a phone call, whether the vehicle is being operated and/or is idle, etc.), as indicated at 614, the current weather, as indicated at 616, and/or any other information associated with the status of the vehicle and/or user. At 618, the method 600 includes determining one or more alternate times to reschedule the presentation of the notification based on the vehicle and/or user status. For example, the timing of displaying the notification may be delayed (e.g., the notification may be displayed at a later time) in response to the activity status indicating reduced driver attention and/or elevated driver activity. In some embodiments, the different types of information indicating the vehicle and/or user status may be given different weights and/or have a different effect on selection of the one or more alternate times from one another. As indicated at 620, the method 600 may include presenting the alternate times to the user, in order to enable the user to provide input indicating a preferred alternate time. In presenting the alternate times to the user, the times may be ordered in accordance with the weighting and/or a determined ranking, whereby the time that is most likely to result in the user affirming that the upgrade should be performed is presented first. In other embodiments, the times may be presented in order of time of day (e.g., the closest time of day to the current time of day may be presented first) and/or in any suitable manner.

At 622, the method 600 may include receiving a confirmation of a selected time to reschedule presentation of the notification from user input to the in-vehicle computing system. For example, the user may select one of the alternate times presented at 620 and/or suggest a different time. At 624, the method 600 includes rescheduling the notification to be presented at the selected time (e.g., the time selected by the user if 620 and 622 are performed, or the time selected by the upgrade scheduler if 620 and 622 are not performed). By rescheduling the upgrade notification, the notification may be presented at the selected time.

Figure 7:
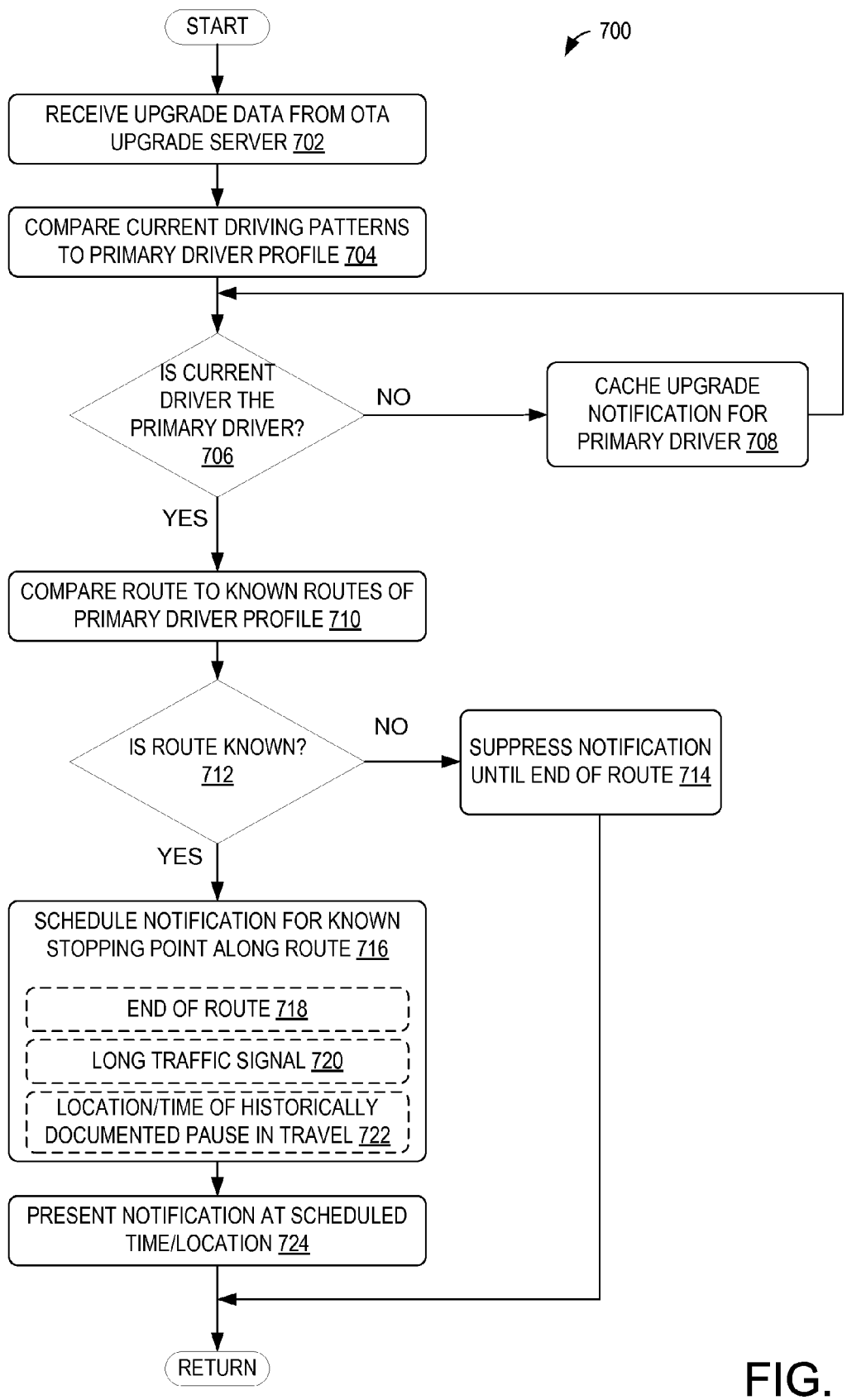
FIG. 7 is a flow chart of a method for scheduling presentation of an upgrade notification to a driver of a vehicle in accordance with one or more embodiments of the present disclosure.

FIG. 7 is a flow chart of a method 700 for scheduling presentation of an upgrade notification to a driver of a vehicle. For example, the method 700 may be performed by an upgrade scheduler associated and/or integrated with an in-vehicle computing system, such as upgrade scheduler 204 of FIG. 2. At 702, the method 700 includes receiving upgrade data from an upgrade server, such as an Over-the-Air (OTA) upgrade server. The method 700 includes comparing the current driving patterns to a primary driver profile at 704. As indicated at 706, the method 700 includes determining if the current driver is the primary driver. For example, embodiments for determining if the current driver is the primary driver are described above with respect to FIG. 4. If the current driver is not determined to be the primary driver (e.g., "NO" at 706), the method proceeds to 708 to cache the upgrade notification for the primary driver. For example, the upgrade notification may be automatically stored (e.g., without user input) until such time as a current driver is determined to be a primary driver. A current driver identification may be continuous, such that information regarding the driving patterns of the current driver are dynamically collected and compared with a primary driver profile. In other embodiments, a current driver identification may be periodic and/or triggered by particular events (e.g., a change in pressure detected on a seat pressure sensor for the driver's seat, an engine shut down event, a door opening event, etc.).

If the current driver is identified as the primary driver (e.g., "YES" at 706), the method 700 proceeds to 710 to compare the current route to known routes of the primary driver profile. For example, historical data relating to the primary driver's driving habits may identify routes that are frequently travelled by the primary driver (e.g., routes to/from work, home, frequented stores, restaurants, and/or other landmarks). The current route may be identified by a navigational system (e.g., a navigational system integrated with the in-vehicle computing system, such as navigation subsystem 311 of FIG. 3), which may indicate a designated destination and/or a vector of travel based on location information determined during a current trip. At 712, the method 700 includes determining if the route is known or recognized. If the route is not known (e.g., "NO" at 712), the method 700 may proceed to 714 to suppress the notification until the end of the route (e.g., until an engine shut down is detected, a door event is sensed, a destination specified by the navigational system is reached, and/or any other suitable indication that the end of the route is reached). In some embodiments, the current route may be continuously and/or periodically compared to the known routes of the primary driver profile, and the notification may be suppressed until a current route matches a known route.

If the route is known or recognized (e.g., "YES" at 712), the method 700 proceeds to 716 to schedule the notification to be presented at a known stopping point along the route. For example, the known stopping point may include the end of the route, as indicated at 718, a notoriously long traffic signal (e.g., a traffic signal at which the primary driver has, on average, stopped for an amount of time that is longer than a threshold), as indicated at 720, a location and/or time of a historically documented pause(s) in travel (e.g., based on data stored locally and/or in a remote server), and/or any other suitable stopping point. Responsive to scheduling the notification for a known stopping point, the method 700 may include presenting the notification at the scheduled time and/or location.

Figure 8:
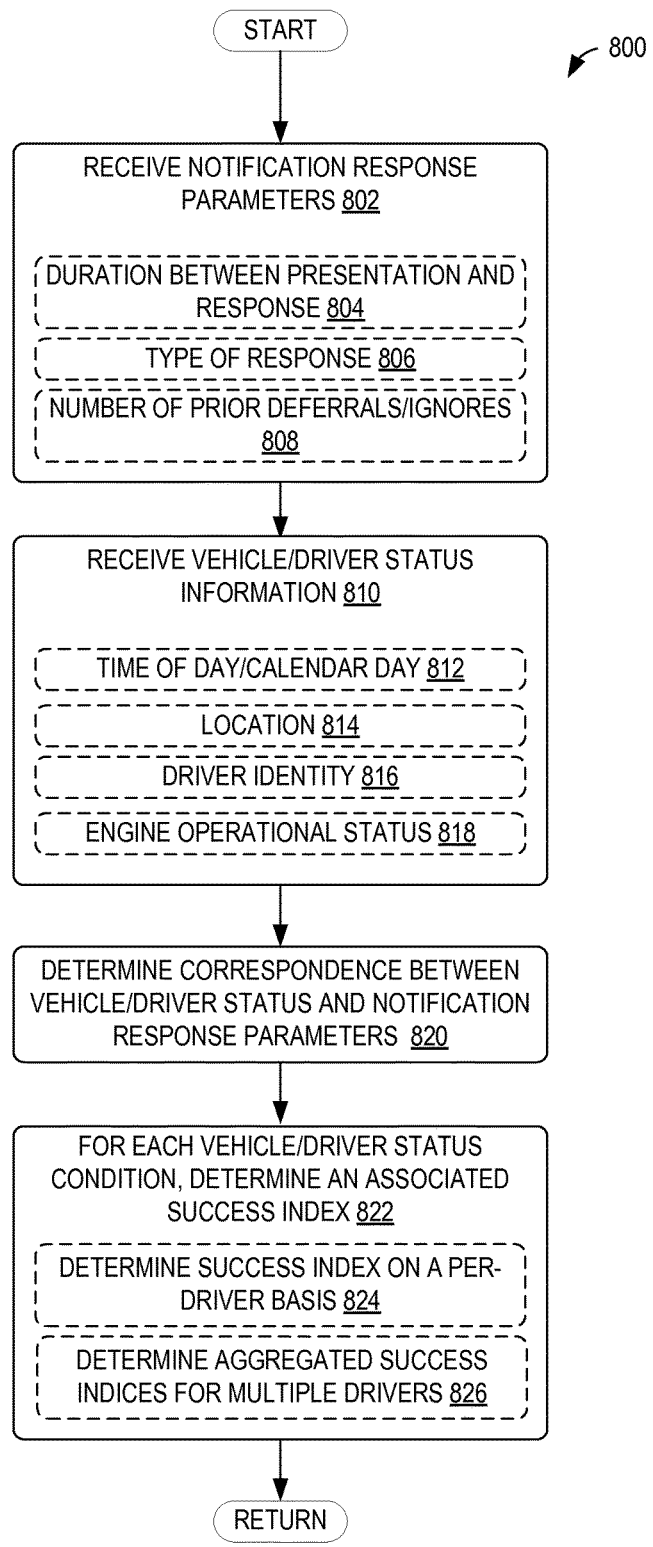
FIG. 8 is a flow chart of a method for determining success rates for presentation of notifications under different vehicle/driver status conditions in accordance with one or more embodiments of the present disclosure.

FIG. 8 is a flow chart of a method 800 for determining success rates for presentation of notifications under different vehicle/driver status conditions. For example, the method 800 may be performed by an upgrade scheduler, such as upgrade scheduler 204 of FIG. 2, and/or a server external to an in-vehicle computing system and in communication with an upgrade scheduler. At 802, the method 800 includes receiving notification response parameters indicating features of a user's response (e.g., user input to an in-vehicle computing system) to presentation of a notification. For example, the parameters may include a duration between the presentation of the notification and receipt of the user response, as indicated at 804, a type of response received at the in-vehicle computing system (e.g., an affirmative response to take an action, a deferral selection, and/or an ignore or lack of response within a threshold response time), as indicated at 806, a number or prior deferrals/ignores, as indicated at 808, and/or any other suitable parameter of a user's response to the notification.

At 810, the method 800 includes receiving vehicle and/or driver status information corresponding to the time at which the response to the notification was received. It is to be understood that the time at which the response to the notification was received may be determined to be a time that compensates for delays in transmission of the user input and/or status information in order to reflect the conditions present while the user provided the user input to the in-vehicle computing system and/or while the notification was being presented via the in-vehicle computing system. The vehicle/driver status information may include conditions such as a time of day/calendar day (e.g., day of the week/month/season/year), as indicated at 812, a location of the vehicle, as indicated at 814, a driver identity, as indicated at 816, an engine operational status (e.g., whether the engine is idle, an engine speed, an acceleration request received at the engine, etc.), and/or any other suitable vehicle/driver status condition.

At 818, the method 800 includes determining a correspondence between the received vehicle/driver status information and the notification response parameters. For example, determining the correspondence may include mapping previously-received notification response parameters to associated vehicle/driver status information indicating conditions that were present during the receipt of the notification responses. In this way, the relationship between certain types of responses and certain vehicle/driver status conditions may be understood to indicate a correlation between a condition and a response.

Based on the determined correspondence, the method 800 includes determining an associated success index for each vehicle/driver status condition, as indicated at 820. For example, a success index for a vehicle/driver status condition may indicate a likelihood that presenting a notification at that condition will result in a successful notification response (e.g., an affirmative response to perform an action responsive to the notification—such as an approval to perform an upgrade to the in-vehicle computing system). In some embodiments, the success index may be determined on a per-driver basis, as indicated at 822, such that each driver profile may include success indices tied to vehicle/driver status conditions based solely on information from that driver. In additional or alternative embodiments, aggregated success indices may be determined for multiple drivers (e.g., all drivers identified in received vehicle/driver status information, all drivers of a particular type of vehicle, all drivers in a region, etc.). For example, all notification responses for notifications presented during a particular vehicle/driver status condition may be aggregated to determine an average type of response received during that condition.

The success index may be utilized to determine a first and/or subsequent schedule times for presenting a notification. For example, an upgrade scheduler may receive the correlated success indices and vehicle/driver status conditions and/or send a current vehicle/drivers status condition to receive an associated success index when determining whether to present a notification. The upgrade scheduler may utilize success indices to determine deferral options for a user to defer a notification by presenting deferral options selected from one or more conditions having a success index that is higher than a threshold, the success index being calculated based on a correlation of previous notification responses received under the conditions.

Figure 9:
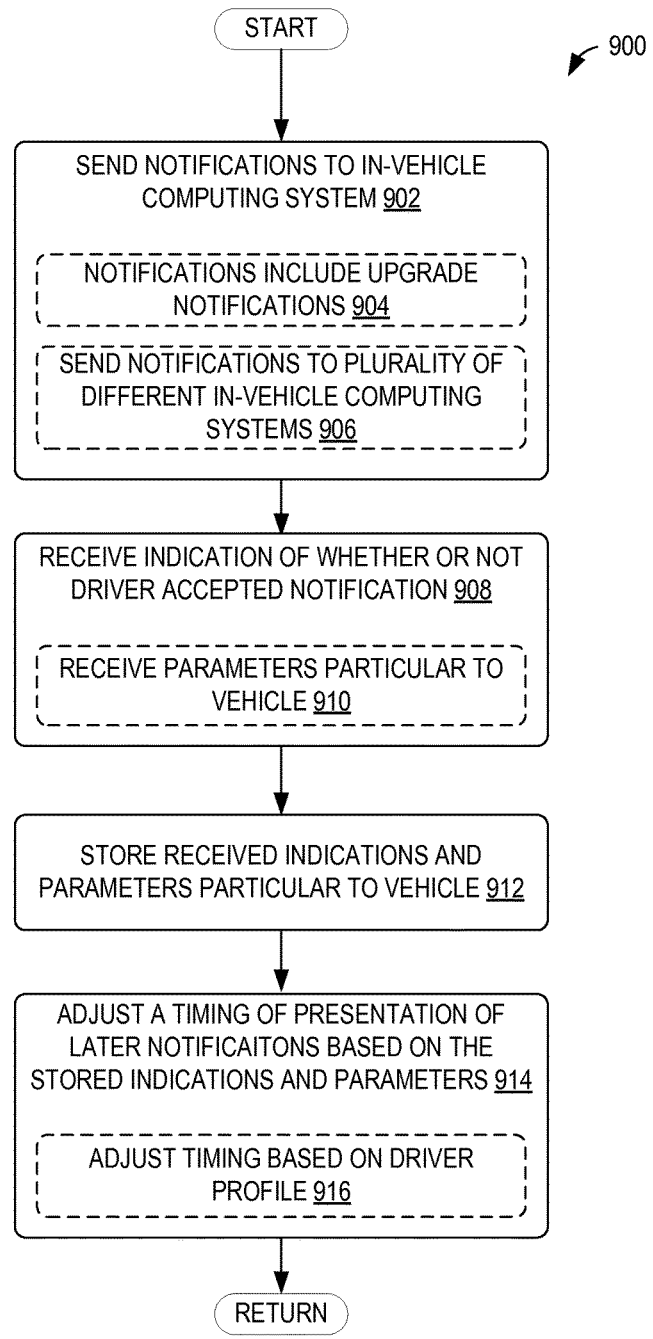
FIG. 9 is a flow chart of a method for managing upgrade notifications for an in-vehicle computing system in accordance with one or more embodiments of the present disclosure.

FIG. 9 is a flow chart of a method 900 for managing upgrade notifications for an in-vehicle computing system. For example, method 900 may be performed by an extra-vehicle server, such as upgrade server 210 and/or one or more of the other external services 346 as described in FIGS. 2 and 3. At 902, the method 900 includes sending upgrade notifications to an in-vehicle computing system for presentation to drivers and/or passengers of the vehicle in which the in-vehicle computing system is housed. For example, the notifications may include upgrade notifications indicating that an upgrade is available for download and/or installation at that in-vehicle computing system, as indicated at 904. The in-vehicle computing system may be integrated and/or permanently mounted in the vehicle, as described above with reference to in-vehicle computing system 109 of FIG. 1. The notifications may be sent to a plurality of different in-vehicle computing systems in a plurality of different vehicles for presentation to the drivers and/or passengers of the vehicles, as indicated at 906.

At 908, the method 900 includes receiving indications from each vehicle of whether or not the respective drivers accepted the notifications. The method 900 may further include receiving parameters particular to each vehicle, as indicated at 910. The parameters may be received from the in-vehicle computing system and/or another source (e.g., a storage device communicatively connected to the extra-vehicle server, another external service, a mobile device, etc.). The parameters may be received simultaneously with the indication (e.g., in the same and/or a different communication stream) in some embodiments. In other embodiments, the parameters may be received before and/or after receiving the indication. The parameters may identify the vehicle and/or any combination of static vehicle parameters (e.g., make, model, vehicle identification number, in-vehicle computing system identifier, etc.) and dynamic vehicle parameters (e.g., current driver/driver status, vehicle operating conditions, historical data for vehicle/driver, etc.). For example, the parameters may indicate and/or be used to identify a driver profile associated with the current driver of the vehicle.

At 912, the method 900 includes storing the received indications in addition to parameters particular to each vehicle. At 914, the method 900 includes adjusting a timing of presentation of later upgrade notifications based on the stored indications and the parameters. For example, the later upgrade notifications may be presented at a time selected by a driver in the indication. The timing may be adjusted based on a driver profile, as indicated at 916. For example, the driver profile may generated based on past driving behaviors, as described above with respect to FIGS. 2 and 4.

Presenting notifications for a first or subsequent time in an intelligent manner may ensure that the notification is not distracting to the driver and that the information included in the notification will be consumed by the driver. By dynamically incorporating information regarding prior, current, and predicted future states of the vehicle and/or driver/passengers of the vehicle to schedule notification presentations, notifications may be presented to the driver more safely and successfully (e.g., resulting in a higher likelihood that a driver will react favorably to the notification—such as by affirming a request to perform an upgrade to the in-vehicle computing system) than systems that utilize pre-defined scheduling techniques. Further, by utilizing the intelligent suggestions of alternate times described above responsive to a dismissal and/or deferral of the notification by a driver, the systems and methods of the present disclosure may reduce driver distraction and frustration in comparison to systems and methods that automatically reschedule or defer presentation for a predefined interval after an initial presentation.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109, upgrade scheduler 204, and/or notification engine 206 described with reference to FIGS. 1 and 2. The methods may be performed by executing stored instructions with one or more logic devices (e.g., processors) in combination with one or more additional hardware elements, such as storage devices, memory, hardware network interfaces/antennas, clock circuits, switches, actuators, displays, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. It is to be understood that example vehicle/user status information, driver profile characteristics, and other inputs and outputs to the system described above are exemplary and are not intended to be exhaustive. The following claims particularly point out subject matter from the above disclosure that is regarded as novel and non-obvious.

The invention claimed is:

1. A method for an in-vehicle computing system, the method comprising:
receiving, at the in-vehicle computing system, data regarding a notification for presentation to a driver of a vehicle, the data being received over the air from a network or a cloud computing system communicatively coupled to the in-vehicle computing system;
based on a driver profile, adjusting, with the in-vehicle computing system, a timing of presenting the notification to the driver via an output device coupled to or included in the in-vehicle computing system, wherein the driver profile is generated based on at least past driving behavior associated with the driver, the past driving behavior including past interactions between the driver and a user interface of the in-vehicle computing system relating to a presentation of a prior notification during a prior vehicle trip, data for the prior notification being received over the air from the network or the cloud computing system; and
selectively presenting the notification to the driver via the output device according to the adjusted timing.

2. The method of claim 1, wherein the notification includes one or more of available software updates for the in-vehicle computing system, vehicle recall data, and environmental information.

3. The method of claim 1, wherein the past interactions between the driver and the user interface include user input received responsive to one or more notification presentations during at least the prior vehicle trip, and wherein the method further comprises, for each of the past interactions between the driver and the user interface, receiving status information for at least one of a driver and a vehicle corresponding to a status condition at a time at which the past interaction occurs, and determining a correspondence between the status condition and the associated past interaction, the method further comprising determining an associated success index for each status condition indicating a likelihood that presenting a notification during that condition will result in a selected notification response.

4. The method of claim 1, further comprising identifying the driver responsive to a vehicle event, the driver profile being associated with the identified driver, and wherein adjusting the timing based on the driver profile includes, in response to the driver profile being indicative of a secondary driver, delaying presentation of the notification.

5. The method of claim 1, wherein the past driving behavior associated with the driver further includes driver-specific driving data aggregated at the in-vehicle computing system during one or more prior vehicle trips, the driving data including one or more of driving route, seat position, steering wheel position, accelerator pedal usage profile, brake pedal usage profile, and vehicle turning hardness.

6. The method of claim 1, wherein adjusting the timing based on the driver profile includes, in response to the driver profile being indicative of a primary driver, displaying the notification to the driver based on primary driver display preferences included in the driver profile, and wherein the past interactions between the driver and the user interface include parameters of responses to one or more notifications presentations by the primary driver during at least the prior vehicle trip, the parameters including one or more of a type of response and a number of prior deferrals or ignores of the one or more notifications.

7. The method of claim 6, wherein displaying based on primary driver display preferences includes displaying deferral options to the primary driver, the deferral options based on the driver profile of the primary driver.

8. The method of claim 6, wherein the timing of displaying the notification to the primary driver is further based on current vehicle status including a geographical location of the vehicle, a vehicle route, a time of day of vehicle operation, traffic conditions at the geographical location of the vehicle, vehicle speed, and engine speed.

9. The method of claim 8, wherein the timing of displaying based on current vehicle status includes displaying one or more deferral options based on the current vehicle status.

10. The method of claim 6, wherein the timing of displaying the notification to the primary driver is further based on one or more of an urgency level of the notification and a contextual parameter of the notification.

11. An in-vehicle computing system of a vehicle, the in-vehicle computing system, comprising:
 a processor;
 a navigational device;
 a communication interface communicatively coupling the in-vehicle computing system to a cloud-based network;
 a display device; and
 a storage device storing instructions executable by the processor to:
  receive a notification for presentation to a vehicle driver over the air from the cloud-based network, the notification regarding a vehicle parameter; and
  adjust a timing of displaying the notification to the vehicle driver on the display device during vehicle travel based on positional and temporal information of the vehicle received from the navigational device and based on past interactions between the vehicle driver and a user interface of the in-vehicle computing system during a prior vehicle trip, the past interactions relating to a presentation of a prior notification during the prior vehicle trip, data for the prior notification being received over the air from the cloud-based network.

12. The system of claim 11, wherein adjusting the timing of displaying based on positional and temporal information includes,
 inferring a vehicle route and destination based on the positional and temporal information; and
 automatically deferring displaying of the notification until a predefined location on the vehicle route is reached.

13. The system of claim 11, wherein adjusting the timing of displaying based on positional and temporal information includes,
 inferring a vehicle route and destination based on the positional and temporal information; and
 automatically deferring displaying of the notification until a threshold duration has elapsed, the duration based on the inferred vehicle route and destination.

14. The system of claim 11, wherein the storage device stores further instructions executable by the processor to:
 monitor an activity status of the vehicle driver; and
 further adjust the timing of displaying the notification based on the monitored activity status, the timing of displaying delayed in response to the activity status indicating reduced driver attention and/or elevated driver activity.

15. The system of claim 11, wherein the storage device stores further instructions executable by the processor to:
 aggregate input regarding a driving behavior of the vehicle driver; and
 update a driver profile on the cloud-based network based on the aggregated input, the driver profile including a plurality of success indices tied to one or more of a vehicle status condition and a driver status condition, each success index of the plurality of success indices indicating a likelihood that presenting a notification at the associated one or more of the vehicle status condition and the driver status condition will result in an affirmative notification response to perform an action responsive to the notification.

16. The system of claim 11, wherein the storage device stores further instructions executable by the processor to:
 identify the vehicle driver based on a driving behavior of the driver relative to one or more driver profiles retrieved from the cloud-based network; and
 further adjust the timing of displaying the notification based on the identity of the vehicle driver.

17. An in-vehicle computing system, comprising:
 a processor;
 an in-vehicle entertainment system;
 a navigational device;
 a communication interface communicatively coupling the in-vehicle computing system to a cloud-based network;
 a display device; and
 a storage device storing instructions executable by the processor to:
  receive a notification for presentation to a vehicle driver from the cloud-based network, the notification regarding a vehicle parameter;
  infer a current vehicle status based on navigational data from the navigational device;
  infer a current user status based on interactions of the vehicle driver with the in-vehicle entertainment system;
  identify the vehicle driver based on current driving behavior in relation to one or more driver profiles stored on the cloud-based network, the one or more driver profiles generated based on past driving behavior associated with each vehicle driver; and
  adjust a timing of displaying the notification on the display device to the vehicle driver based on each of the identity of the vehicle driver, the inferred current vehicle status, and the inferred current user status, wherein a plurality of deferral options are selected from one or more locations along a route of travel of a vehicle having a success index that is higher than a threshold, the success index being calculated based on a correlation of previous notification responses received at the one or more locations along the route of travel.

18. The in-vehicle computing system of claim 17, wherein adjusting the timing of displaying includes:
enabling immediate displaying of the notification in response to the identity of the vehicle driver being indicative of a primary driver; and
delaying displaying of the notification in response to the identity of the vehicle driver being indicative of a secondary driver.

19. The in-vehicle computing system of claim 17, wherein the instructions are further executable to:
display the plurality of deferral options to the vehicle driver, the plurality of deferral options based on the inferred current user status and the inferred current vehicle status.

* * * * *